United States Patent
Canfield

[15] 3,656,571
[45] Apr. 18, 1972

[54] SPORTS VEHICLE
[72] Inventor: Neal R. Canfield, Trego, Wis.
[73] Assignee: Stanley W. Tull Co., Inc., Minneapolis, Minn.
[22] Filed: Apr. 2, 1970
[21] Appl. No.: 25,178

[52] U.S. Cl.....................180/11, 180/54 F, 280/43, 280/96.2
[51] Int. Cl............................................B60k 5/10
[58] Field of Search.................180/11, 54 F, 55–63; 280/96.1, 96.2, 269, 43, 106

[56] References Cited

UNITED STATES PATENTS

| | | | |
|---|---|---|---|
| 3,177,962 | 4/1965 | Bailey | 180/11 |
| 2,710,222 | 6/1955 | Berenyi | 280/106 X |
| 1,312,733 | 8/1919 | Ingram | 280/96.2 |
| 1,991,619 | 2/1935 | Mackenzie | 180/54 F X |
| 3,022,846 | 2/1962 | Thompson | 180/11 |

FOREIGN PATENTS OR APPLICATIONS

| | | | |
|---|---|---|---|
| 1,271,509 | 8/1961 | France | 180/54 F |
| 1,231,766 | 4/1960 | France | 280/43 |
| 1,310,060 | 10/1962 | France | 180/54 F |
| 400,432 | 10/1933 | Great Britain | 180/57 |

Primary Examiner—Benjamin Hersh
Assistant Examiner—Milton L. Smith
Attorney—Burd, Braddock & Bartz

[57] ABSTRACT

A miniature low-clearance, ground-hugging four-wheeled sports cart for racing and other recreational purposes. The cart is characterized by sheet metal frame construction and variable clearance accomplished by readily separable and exchangeable engine and rear axle and wheel mounts, and readily separable and exchangeable front wheel mounts. The cart can be readily converted from standard to racing height and from standard to racing engine, or vice versa, in a matter of minutes.

7 Claims, 12 Drawing Figures

INVENTOR.
NEAL R. CANFIELD
BY
Burd, Braddock & Bartz
ATTORNEYS

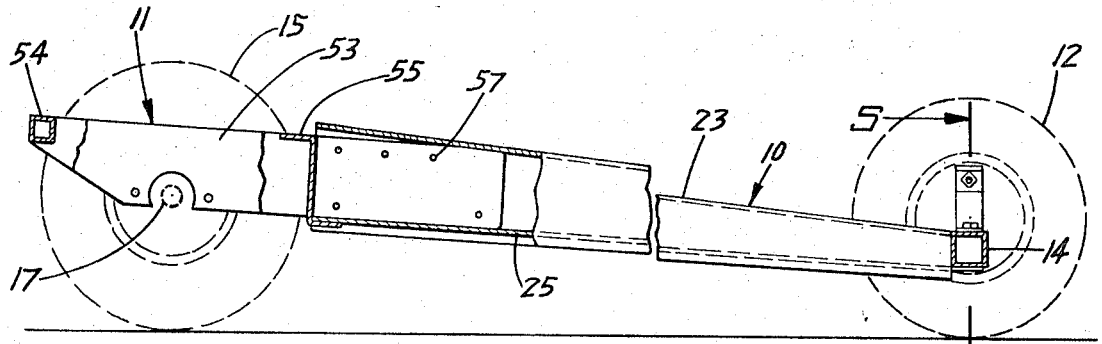
FIG.3
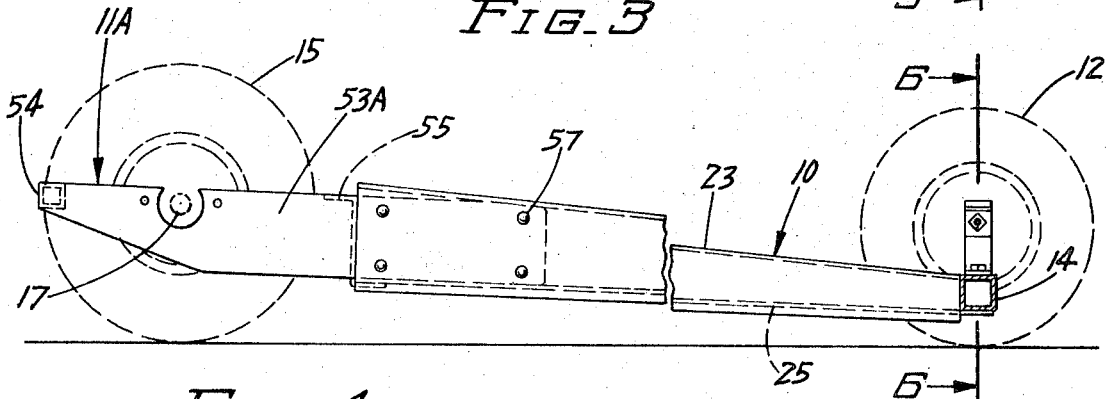
FIG.4
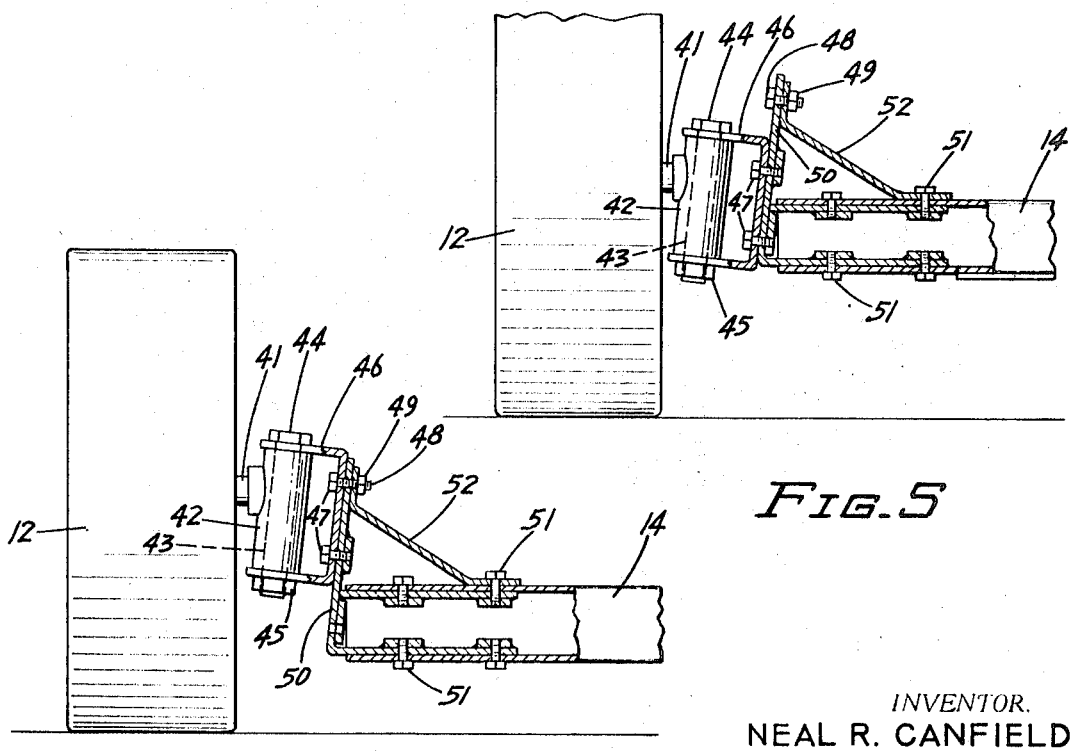
FIG.5
FIG.6
INVENTOR.
NEAL R. CANFIELD
BY
Burd, Braddock & Bartz
ATTORNEYS

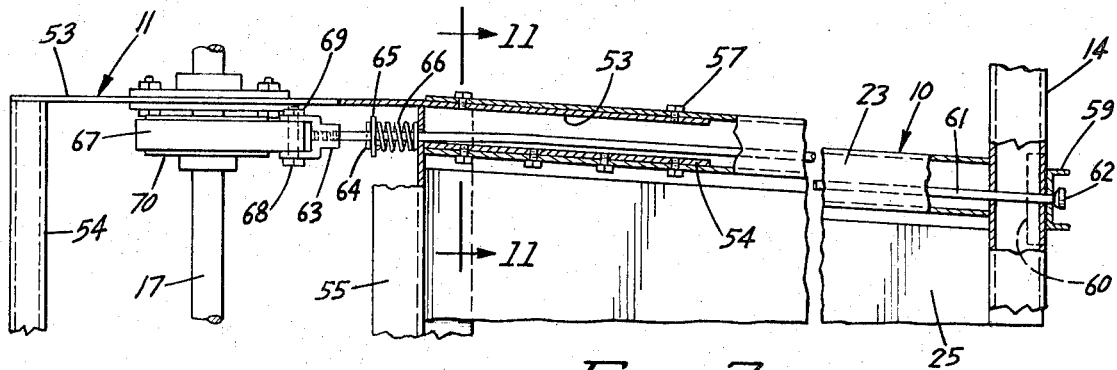
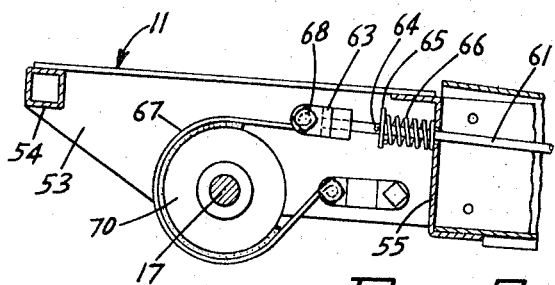
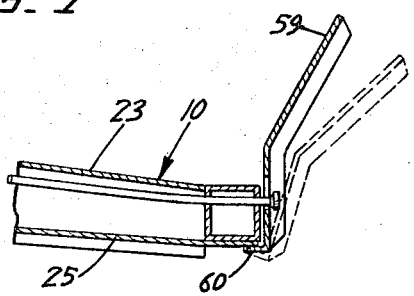
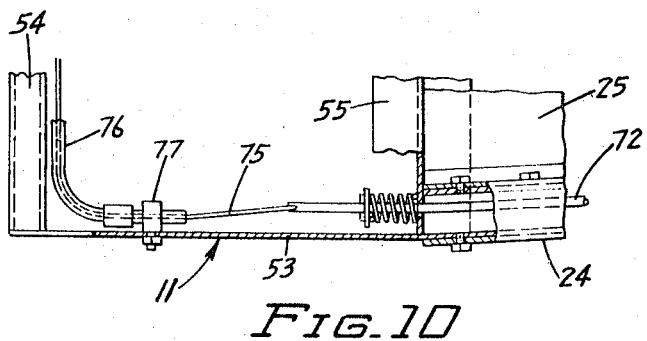
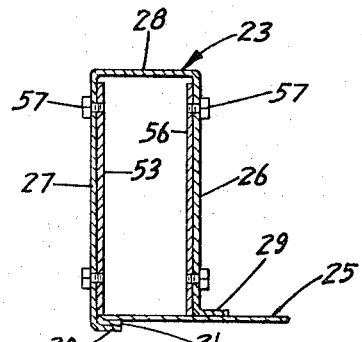
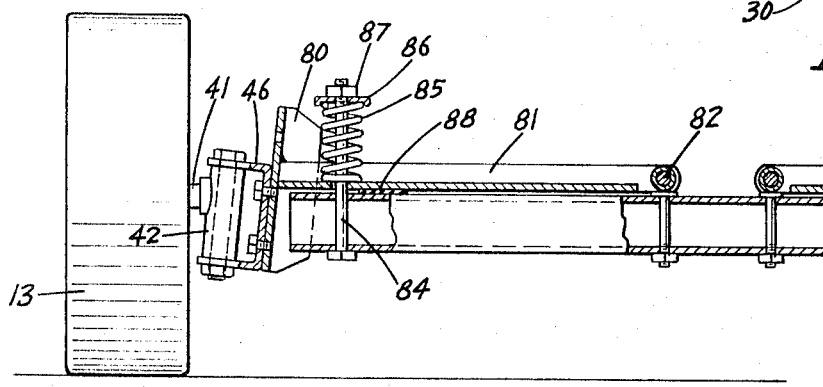

SPORTS VEHICLE

This invention relates to sports vehicles, particularly low-clearance ground-hugging four-wheeled vehicles used for racing and other recreational purposes. Competitive cart racing is one of this country's fastest growing sports. Recreational cart riding is fast finding acceptance by both teen-agers and adults.

Traditionally, the sports cart chassis has been formed from welded tubular steel supporting a sheet metal floor pan. The axles and wheels are supported forwardly and rearwardly by the frame. The rear engine drive has been mounted on the back end of the chassis. To vary the clearance between the standard field driving height and lower racing height, where such variation is possible, has been difficult and time-consuming, requiring substantial disassembly of the unit and remounting of axles, wheels and engine.

The improved sports cart of the present invention includes a chassis of unitary sheet metal construction, a separable engine and rear axle and wheel assembly for easy conversion to and from racing height and easily demountable and remountable front wheels, along with other related improvements.

The invention is illustrated by the accompanying drawings in which:

FIG. 3 is a side elevation, on an enlarged scale and partly broken away, of the chassis including standard front wheel mounting and standard engine and axle mount frame;

FIG. 4 is a similar side elevation showing racing front wheel mounting and the racing engine and axle mount frame;

FIG. 5 is a fragmentary vertical section, on the line 5—5 of FIG. 3 and in the direction of the arrows, showing the standard mounting of the left front wheel;

FIG. 6 is a similar vertical section, on the line 6—6 of FIG. 4 and in the direction of the arrows, showing the racing mounting of the left front wheel;

FIG. 7 is a fragmentary top plan, on an enlarged scale and partly broken away, showing the braking mechanism relative to the chassis;

FIG. 8 is a fragmentary elevation in section showing the front end mounting of the brake pedal;

FIG. 9 is a similar fragmentary elevation in section showing the standard mounting of the brake;

FIG. 10 is a fragmentary elevation in section showing the mounting of the gas feed control;

FIG. 11 is a fragmentary section on an enlarged scale on the line 11—11 of FIG. 7 and showing the details of construction of the main chassis frame and means of connection of the separable rear axle and engine mount to the main chassis frame; and FIG. 12 is a fragmentary front elevation partly in section showing an alternative spring suspension of the front axle.

Figure 2:
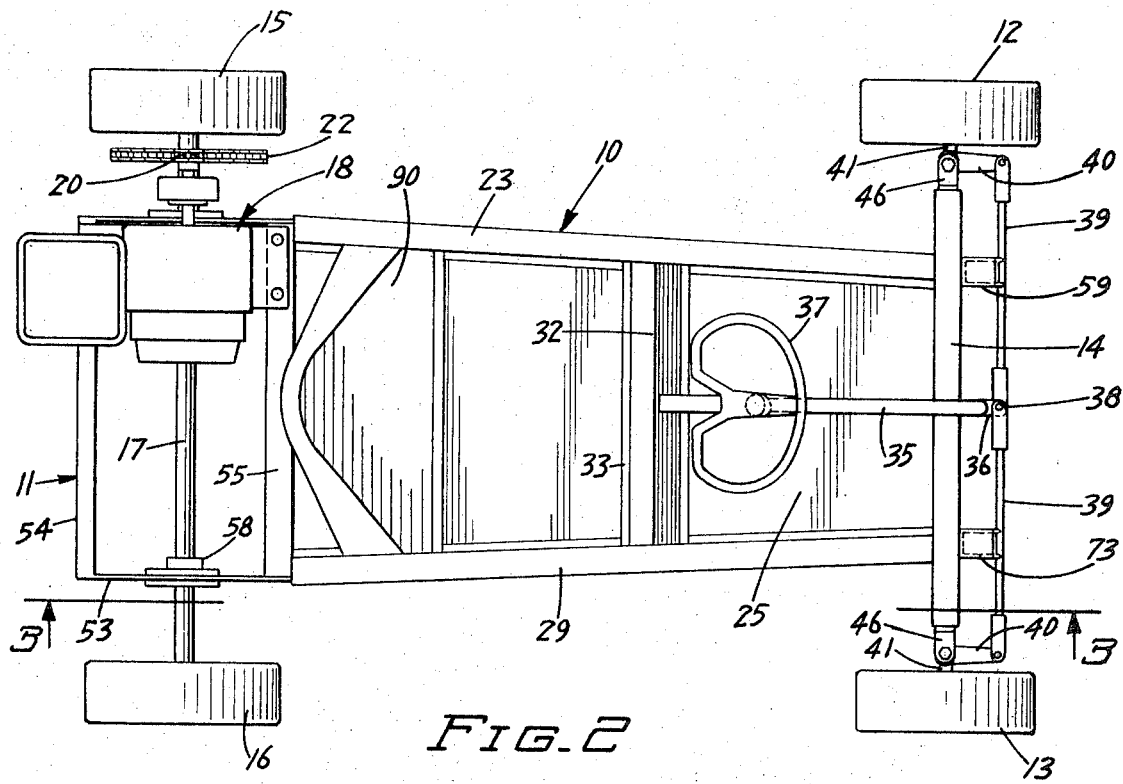
FIG. 2 is a top plan of the sports cart.
Figure 1:
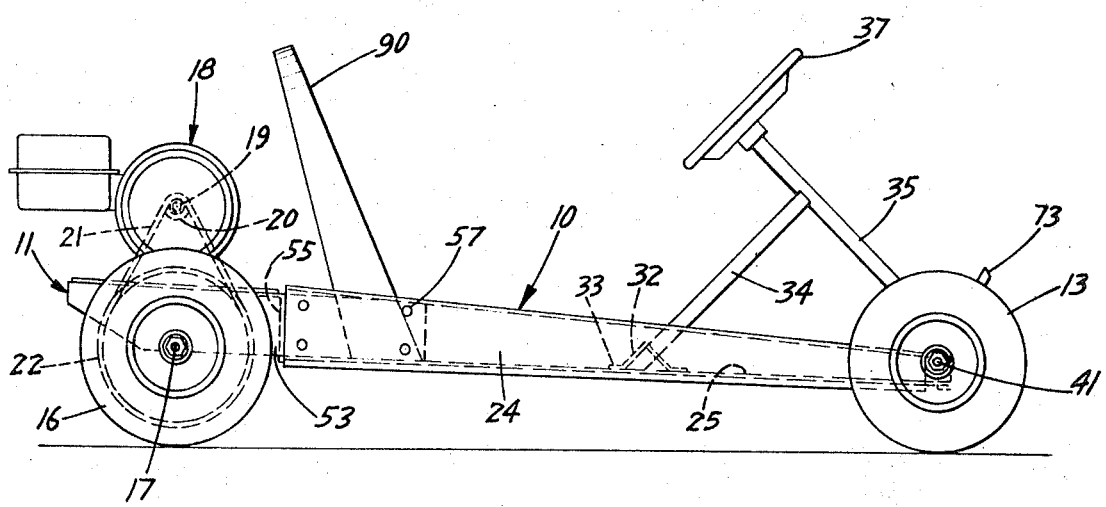
FIG. 1 is a right side elevation of the sports cart shown at its standard height.

Referring now to the drawings, and particularly to FIGS. 1 and 2, the sports cart of the present invention includes a chassis having a main frame, indicated generally at 10, and a separable rear axle and engine mount, indicated generally at 11. Left and right front wheels 12 and 13, respectively, are supported from front axle 14 carried by the forward part of the chassis frame. Left and right rear wheels 15 and 16, respectively, are supported from rear axle 17, in turn journaled in the rear axle and engine mount 11. An internal combustion engine 18 of appropriate horsepower is supported on the mount 11. The power output shaft 19 of engine 18 carries a drive sprocket 20 connected by appropriate chain or belt drive means 21 to a drive sprocket 22 keyed to rear axle 17 to drive rear wheels 15 and 16.

The main chassis assembly 10 is comprised of spaced apart longitudinally extending left and right hand side rails 23 and 24, respectively, and an interconnecting bottom pan 25. Side rails 23 and 24 are of identical construction except that they are mirror-images of one another. As best seen in FIG. 11, each side rail is formed from sheet metal and includes an inner vertical wall 26, a spaced apart outer vertical wall 27 of slightly greater width and an integral interconnecting horizontal top wall 28. The bottom edge of inner wall 26 is provided with a horizontal inwardly extending (toward the longitudinal axis of the cart) lip or flange 29. The bottom edge of outer wall 27 is similarly provided with an inwardly extending lip or flange 30, the top surface of which is spaced below the bottom surface of flange 29 by approximately twice the thickness of bottom pan 25.

The opposite side edges of bottom pan 25 are folded as at 31 for additional strength and rigidity and engage flange or lip 30. The bottom surface of flange 29 engages the top surface of pan 25 spaced inwardly from its edge and the assembly is rigidly secured together, as by spot welding or the like. The rearward ends of the side rails and pan are substantially coterminous. The forward edge of pan 25 extends a short distance forward of the forward ends of the side rails and front axle 14 rests and is secured thereon, being fixed, as by welding, to the pan and forward ends of the side rails.

A transverse beam or bracket support 32 formed from sheet metal and of triangular cross section extends between the side rails slightly forward of midway between the ends thereof. The edges of beam 32 are bent outwardly to form flanges 33 by which the beam is secured to the bottom pan, as by welding. The ends of beam 32 are secured to the inside walls of the opposite side rails, as by welding. A steering column post 34 intersects beam 32 midway between its ends. One end of post 34 is secured as by welding to the beam 32. The other end is secured, as by welding, to steering tube 35. The steering tube 35 is seated in the top forward edge of front axle 14 adjacent its forward end and is secured thereto, as by welding. A steering post or rod 36 extends through tube 35, being fitted at one end with a steering wheel 37 or similar steering means. The opposite end of the steering post is pivotally connected at 38 to a pair of horizontal linkages 39 which in turn are pivotally connected to arms 40 for steering front wheels 12 and 13, as described hereinafter.

As best seen in FIGS. 5 and 6, each front wheel 12 and 13 is journaled for rotation on a horizontal stub shaft 41 rigidly secured to a tubular hub 42 which extends generally vertically, but preferably at an angle of about 7° from true vertical. Hub 42 rotates about a shaft or spindle 43 which is the shank of a bolt whose head 44 engages one arm of a bifurcated spindle yoke 46 and whose other end is secured in the other arm of the spindle yoke by means of nut 45. Spindle yoke 46 in turn is secured by means of screws 46 and/or bolt 48 and nut 49 to bracket 50 which is rigidly secured in the opposite ends of front axle 14 by means of screws 51 which engage internal weld nuts, and preferably is further strengthened by means of angle brace 52.

As seen by comparison of FIGS. 5 and 6, the front wheels may be mounted to provide either of two alternative clearances. In FIG. 5, which illustrates the standard height for a clearance of about 3 inches, the spindle yoke 46 is secured to bracket 50 in the center and lower of two mounting holes, being secured to the bracket by a pair of screws 47 each of which engages a weld nut. In FIG. 6, the wheel is mounted in the lower or racing position with clearance of about 1-½ inches by virtue of the spindle yoke 46 being attached to the bracket 50 in the upper two of the three mounting holes by means of screw 47 in the middle hole and bolt and nut 48–49 in the upper hole, the bolt and nut also engaging brace 52. The front wheels may be readily changed from standard to racing position in a very few minutes simply by disengagement and engagement of screws 47 and bolt and nut 48–49. Steering arms 40 are secured to hubs 42 and thereby accomplish steering by pivotal movement of the wheels on hubs 42 about spindles 43.

The engine and rear axle mount frame 11 of the chassis comprises a pair of longitudinally extending generally horizontal and spaced apart outer plates 53 connected together at their rearward extremities by means of a transverse horizontal cross bar 54 and a transverse horizontal Z-bar 55 intermediate of the ends of the side plates. The upper surface of Z-bar 55 extends rearwardly and the lower surface of the Z-bar extends forwardly. A pair of inner frame plates 56 extend forward from the forward surface of the Z-bar spaced apart from and parallel to the forward ends of side bars 53 and substantially coextensive therewith. The members of engine mount frame 11 are secured together in a rigid structure, as by welding.

The forward ends of side plates 53 and the inner side plates 56 comprise a pair of tongue-like members which fit telescopically within the rearward ends of side rails 23 and 24 of the main chassis frame and are rigidly secured therein, as by means of a plurality of screws 57. The engine and rear axle mount can be readily disengaged and replaced or exchanged simply by disengaging each of nuts 57, disengaging the brake and gas feed controls, as described hereinafter, and removing the projecting tongues of the mount 11 from the side rails of the main chassis frame, inserting the tongues of another mount 11 and re-engaging the screws 57.

The lower edges of side bars 53 are provided with recesses for rear axle 17 which is journaled in bearings 58 secured to the side plates. The engine 17 is mounted on cross bars 54 and 55. As seen by comparison of FIGS. 3 and 4, the standard engine and rear axle mount 11 differs slightly from the racing engine and rear axle support 11A. In order to provide for lower mounting of the wheels to provide for lesser clearance, the side bars 53A are recessed on their upper edges to receive rear axle 17. In all other respects, the engine and rear axle mounts are generally the same except that for racing purposes a larger engine of higher horsepower is ordinarily used.

As seen in FIGS. 7, 8 and 9, a brake pedal 59 is pivotally mounted on the forward edge of front axle 14. A lip 60 engages the bottom surface of axle 14 and functions as a pivot point. The brake pedal 59 is held in place by virtue of a brake rod 61 whose head 62 engages the brake pedal. Brake rod 61 passes through the tubular side rail 23 through appropriately located holes in the surfaces of front axle 14 and Z-bar 55 to an internally threaded bifurcated fitting 63 which engages the threaded rearward end of the brake rod. A transverse pin 64, washer 65 and heavy coil spring 66 disposed between fitting 63 and the rearward surface of Z-bar 55 maintain the brake rod under spring tension so as to maintain the pedal 59 in its normal position shown in solid lines in FIG. 8.

One end of brake band 67 is secured by means of bolt 68 and nut 69 in fitting 63. The opposite end of flexible brake band 67 is anchored to the frame at 70. The spring tensioning also serves to hold the brake band backed off slightly out of engagement with band brake 71 for normal running operation. However, as the brake pedal is depressed into operating position, as shown in broken lines in FIG. 8, against the tension of spring 66, then the brake band engages the brake to slow down and stop the vehicle. For changing of engine and rear axle mounts, the brake mechanism is readily disengageable simply by removal of bolt 68 and nut 69.

As seen in FIG. 10, an accelerator control rod 72 is similarly positioned in side rail 24 of the main chassis frame for actuation by gas pedal 73 (FIGS. 1 and 2). Acceleration control rod 72 is spring loaded by means of a pin, washer and coil spring in the same manner as brake rod 61. A wire or cable 75 which passes through a flexible hollow tube 76 to the throttle of engine 18 is connected to the rearward end of acceleration control rod 72 for quick and easy connection and disconnection. The end of tubing 76 is held fixed to frame 11 by means of a fitting 77 secured to side plate 53.

In FIG. 12, there is shown an alternative form of mounting the front wheels in a spring suspension system. Wheels 12 and 13 are mounted on stub shafts 41, hubs 42 and spindle yokes 46 in the manner already described. However, according to the alternative system, the spindle yoke 46 is mounted in either standard or racing position in the mounting holes of a bracket 80 carried just beyond the ends of front axle 14 at the ends of a pair of control arms 81 extending along the tops of the front axle. The inner ends of control arms 81 are pivotally attached at 82 to the front axle. Control arms 81 are desirably in the form of U-shaped channels. Spring mounting for the control arms is provided adjacent the opposite end by means of an elongated bolt 84 extending upwardly through the front axle 14 and the base of the channel control arm and beyond. A heavy coil spring 85 is held on the upper end of bolt 84 bearing against the top of the control arm by means of a retainer washer 86 and nut 87. A resilient bumper pad 88 is mounted between the top surface of axle 14 and the bottom surface of control arm 81. It will be seen that spring 85 will absorb bumps and jolts which the wheels are subjected to without transmitting them to the chassis frame. The spring suspension system is shown with the wheel 13 in standard mounting position in the lower two of the three mounting holes in bracket 80. For racing, the spindle yoke 46 is secured to bracket 80 in the upper two of the three mounting holes, in generally the same manner as described in connection with FIGS. 5 and 6.

A back rest 90 is provided in the rearward end of the main chassis frame 10, just forward of the engine mount 11. The operator sits on the bottom pan, cushioning and padding being provided, as desired. The operator sits low with his heels resting upon the side rails and left and right soles resting upon the brake and gas pedals, respectively. The steering column rises generally between the knees and the driver generally rides in a crouched position with the torso bent forward toward the steering wheel.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. In a low-clearance ground-hugging four-wheeled sports vehicle for racing and other recreational purposes comprising a chassis, four wheels secured thereto, driving power means, steering means and acceleration and braking means, the improvement which consists in:
   A. a chassis including:
      1. a forward main frame carrying a front axle adjacent its forward end, said forward main frame including:
         a. a pair of spaced apart tubular side rails and an interconnecting bottom sheet metal pan extending between the side rails,
         b. said side rails being of substantially rectangular cross-section formed from sheet metal, the side edges of said bottom pan forming the bottom sides of the rails, and
         c. said front axle being tubular and extending transversely across the forward end of said frame rigidly secured to said side rails and bottom pan, and
      2. a readily separable and exchangeable rear frame disengageably secured to the main frame and carrying a rear axle and means for mounting an engine, said rear frame including:
         a. a pair of spaced apart forwardly extending tongue-like members telescopically engageable with the rearward ends of said side rails, and
         b. bearing means rearwardly of said tongue-like members journaling a rear drive axle,
   B. readily separable and exchangeable front wheel mounts disengageably secured to said front axle,
   C. braking control means carried by said main frame disengageably secured to braking means carried by said rear frame, and
   D. acceleration control means carried by said main frame and disengageably secured to acceleration means carried by said rear frame.

2. A sports vehicle according to claim 1 further characterized in that the tongue-like members of said rear frame include:
   A. a pair of spaced apart longitudinally extending side plates and transverse interconnecting means spaced from the forward ends of said side plates and securing the side plates together, and B. a pair of inner plates spaced from and substantially parallel to the forward ends of said side plates and extending forwardly from said transverse interconnecting means and rigidly secured thereto.

3. A sports vehicle according to claim 2, further characterized in that:
A. recesses are provided in the upper edges of said side plates to receive the rear axle therethrough, and
B. said bearing means are carried by said side plates in alignment with said recesses,
whereby the rear wheels are mounted at standard height.

4. A sports vehicle according to claim 2, further characterized in that:
A. recesses are provided in the lower edges of said side plates to receive the rear axle therethrough, and
B. said bearing means are carried by said side plates in alignment with said recesses,
whereby the rear wheels are mounted at racing height.

5. In a low-clearance ground-hugging four-wheeled sports vehicle for racing and other recreational purposes comprising a chassis, four wheels secured thereto, driving power means, steering means and acceleration and breaking means, the improvement which consists in:
A. a chassis including:
1. a forward main frame carrying a front axle adjacent its forward end, and
2. a readily separable and exchangeable rear frame disengageably secured to the main frame and carrying a rear axle and means for mounting an engine,
B. readily separable and exchangeable front wheel mounts disengageably secured to said front axle, said front wheel mounts including:
1. a spindle yoke means carrying a hub for pivotal rotation about a generally vertical axis,
2. a stub shaft on said hub for carrying a wheel for rotation about a substantially horizontal axis,
3. bracket means carried by said front axle for disengageably supporting said spindle yoke means, and
4. a plurality of fastening means carried by said bracket means for supporting said spindle yoke means at any of a plurality of positions,
C. braking control means carried by said main frame disengageably secured to braking means carried by said rear frame,
D. acceleration control means carried by said main frame and disengageably secured to acceleration means carried by said rear frame,
E. a pair of aligned elongated steering control arms overlying the top surface of said front axle,
1. one end of each of said control arms being pivotally attached to said axle,
2. the other end of each of said control arms extending beyond the end of the axle and supporting said spindle yoke bracket, and
3. spring loading means for maintaining said control arms in resilient engagement with the axle.

6. In a low-clearance ground-hugging four-wheeled sports vehicle for racing and other recreational purposes comprising a chassis, four wheels secured thereto, driving power means, steering means and acceleration and braking means, the improvement which consists in:
A. a chassis including:
1. a forward main frame carrying a front axle adjacent its forward end, said forward main frame including:
a. a pair of spaced apart tubular side rails and an interconnecting bottom sheet metal pan extending between the side rails,
b. said side rails being of substantially rectangular cross-section formed from sheet metal, the side edges of said bottom pan forming the bottom sides of the rails, and
c. said front axle being tubular and extending transversely across the forward end of said frame rigidly secured to said side rails and bottom pan, and
2. a readily separable and exchangeable rear frame disengageably secured to the main frame and carrying a rear axle and means for mounting an engine,
B. readily separable and exchangeable front wheel mounts disengageably secured to said front axle,
C. braking control means carried by said main frame disengageably secured to braking means carried by said rear frame, said braking control means including:
1. a pedal pivotally attached to said front axle in alignment with one of said side rails,
2. one end of an elongated control rod being secured to said pedal and said control rod extending through said side rail, and
3. ready disconnect means provided on the opposite end of said control rod for attachment to said braking means carried by said rear frame, and
D. acceleration control means carried by said main frame and disengageably secured to acceleration means carried by said rear frame.

7. In a low-clearance ground-hugging four-wheeled sports vehicle for racing and other recreational purposes comprising a chassis, four wheels secured thereto, driving power means, steering means and acceleration and braking means, the improvement which consists in:
A. a chassis including:
1. a forward main frame carrying a front axle adjacent its forward end, said forward main frame including:
a. a pair of spaced apart tubular side rails and an interconnecting bottom sheet metal pan extending between the side rails,
b. said side rails being of substantially rectangular cross-section formed from sheet metal, the side edges of said bottom pan forming the bottom sides of the rails, and
c. said front axle being tubular and extending transversely across the forward end of said frame rigidly secured to said side rails and bottom pan, and
2. a readily separable and exchangeable rear frame disengageably secured to the main frame and carrying a rear axle and means for mounting an engine,
B. readily separable and exchangeable front wheel mounts disengageably secured to said front axle,
C. braking control means carried by said main frame disengageably secured to braking means carried by said rear frame, and
D. acceleration control means carried by said main frame and disengageably secured to acceleration means carried by said rear frame, said acceleration control means including:
1. a pedal pivotally attached to said front axle in alignment with one of said side rails,
2. one end of an elongated control rod being secured to said pedal and said control rod extending through said side rail, and
3. ready disconnect means provided in the opposite end of said control rod for attachment to means for regulation of the throttle of the engine carried by said rear frame.

* * * * *